United States Patent
Princinsky et al.

(10) Patent No.: US 8,446,701 B2
(45) Date of Patent: May 21, 2013

(54) SINGLE-PHASE TRANSIENT VOLTAGE SUPPRESSION CIRCUIT

(76) Inventors: Daniel E. Princinsky, Saginaw, MI (US); William A. Hinton, Reesse, MI (US)

(*) Notice: Subject to any disclaimer, the term of this patent is extended or adjusted under 35 U.S.C. 154(b) by 480 days.

(21) Appl. No.: 12/135,527

(22) Filed: Jun. 9, 2008

(65) Prior Publication Data

US 2009/0303651 A1    Dec. 10, 2009

(51) Int. Cl.
*H02H 3/22* (2006.01)

(52) U.S. Cl.
USPC .......................................... 361/111

(58) Field of Classification Search ............ 361/45, 361/111; 307/105
See application file for complete search history.

(56) References Cited

U.S. PATENT DOCUMENTS

| | | | | |
|---|---|---|---|---|
| 2,497,699 | A * | 2/1950 | Sutherland | 361/37 |
| 3,043,997 | A * | 7/1962 | Marshall | 318/681 |
| 6,888,709 | B2 * | 5/2005 | Princinsky et al. | 361/47 |

* cited by examiner

*Primary Examiner* — Rexford Barnie
*Assistant Examiner* — Christopher Clark
(74) *Attorney, Agent, or Firm* — Baker Botts L.L.P.

(57) ABSTRACT

In accordance with the disclosed subject matter herein, an apparatus for suppressing in a split-phase power system, effects of line-to-ground transient voltage spikes, balancing phase voltage with respect to ground, filtering phase voltage harmonics, cleaning up electrical noise in a split-phase power system, redirecting energy and absorbing electrical noise, protecting or replacing typical TVSS (transient voltage surge suppressor) units. The apparatus of the present invention can not be damaged by electrical noise. It uses virtually no energy in monitor mode and cannot draw over 3 amps. The apparatus of the present invention can be applied to single-phase lines from center tapped delta power transformers.

In some embodiments of the disclosed subject matter, an apparatus for use with a power supply bus having at least a first power line and a second power line. An exemplary apparatus includes an interface having an input side and an output side, the input side capable of being coupled to at least the first power line, the second power line and ground node, and the output side of the interface having at least first and second output nodes.

4 Claims, 4 Drawing Sheets

Noise Suppression Circuit Single Phaseback

Fig. 1 Noise Suppression Circuit Single Phaseback

Spike Generator Test Voltage with Single Phaseback OFF

Waveforms With Single Phaseback ON And Spike Generator ON

This is the Noise Energy Filtered by the Single Phaseback

SINGLE-PHASE TRANSIENT VOLTAGE SUPPRESSION CIRCUIT

BACKGROUND OF THE INVENTION

In settings such as small plants, factories, houses or other small-scale systems that utilize single-phase or center tapped-delta power, switching power supplies and variable frequency drives, phase unbalance and harmonic noise present in electrical circuits can cause numerous problems. Phase unbalance with respect to ground is the main source of noise. Voltage balance is probably the single most important aspect of power quality. Just a slight voltage imbalance can damage a motor that is operating at full capacity. Voltage balance is the weak point of rotary and static converters, and even utility three-phase service can be unbalanced enough to harm three-phase equipment. The impact of this problem is evident by the huge industry in manufacturing of devices that monitor phase balance to protect motors. Phase unbalance and resulting harmonic noise can destroy electronic components, increase the number of control lock-ups requiring rebooting, shorten the life of electric motors, and lower system reliability.

These transient voltage spikes and harmonics may be caused by switching occurring at an upstream power-station, switch mode power supplies and variable frequency drives, or numerous other events. Such transient voltage spikes and harmonics can severely damage or destroy equipment connected to the affected single-phase circuit, or, when the system employs circuit interrupters, can cause those interrupters to open the circuit, resulting in power outages throughout the plant. Such outages have negative economic effects since productive equipment remains non-functional until the circuit is re-energized.

Inductors have been used for harmonic mitigation for many years. However, the prior art systems have several shortcomings. Variable frequency drives generate more noise when running with a light load, and inductors, which are current smoothing devices, are ineffective at removing transient electrical noise including harmonics. Such a system causes stress on devices connected to the circuit and may damage or cause permanent failure of the components. Additionally, the solid-state components used in the drive systems are degraded by the harmonics caused by the drive itself. What's more, metal oxide varistors (MOV) based TVSS (transient voltage surge suppressor) will not address the spikes injected at the zero crossing as they are below the clamping voltage but these spikes (noise) can be removed by the Single Phaseback.

SUMMARY OF THE INVENTION

In accordance with the disclosed subject matter herein, an apparatus for suppressing in a split-phase power system, effects of line-to-ground transient voltage spikes, balancing phase voltage with respect to ground, filtering phase voltage harmonics, cleaning up electrical noise in a split-phase power system, redirecting energy and absorbing electrical noise, protecting or replacing typical TVSS (transient voltage surge suppressor) units. Said apparatus can not be damaged by electrical noise. It uses virtually no energy in monitor mode and cannot draw over 3 amps. The apparatus of the present invention can be also applied to single-phase from center tapped delta power transformers.

In some embodiments of the disclosed subject matter, an apparatus for use with a power distribution system having at least a first power line and a second power line. An exemplary apparatus includes an interface having an input side and an output side, the input side capable of being coupled to at least the first power line, the second power line and ground node, and the output side of the interface having at least first and second output nodes. Furthermore, the exemplary apparatus includes a transformer having a primary side and a secondary side, the primary side having two primary coils, each primary coil having a first terminal and a second terminal, the first terminal of the first primary coil coupled to the first output node of the interface, the second terminal of the first primary coil coupled to the first terminal of the second primary coil and to the ground line, the second terminal of the second primary coil coupled to the second output node of the interface, and the secondary side of the transformer having two secondary coils, each secondary coil having a first terminal and a second terminal, the second terminal of the first secondary coil coupled to the second terminal of the second secondary coil. Additionally, the exemplary apparatus includes a power resistor, coupled between the first terminal of the first secondary coil and the first terminal of the second secondary coil.

In some embodiments, the exemplary apparatus can include an adjustable power resistor.

In some embodiments, the exemplary apparatus can include the power resistor which can be rated for approximately 200 Ohms at normal operating temperature.

In some embodiments, the exemplary apparatus can include a cooling device in place, such as a fan to assist in dissipating the heat produced during operation of the circuit.

BRIEF DESCRIPTION OF THE DRAWINGS

For a more complete understanding of the present invention, reference is made to the following detailed description of exemplary embodiments with reference to the accompanying drawings in which:

FIG. 3 presents the oscillogram of waveforms representing tested electrical current with Single Phaseback turned ON and spike generator turned ON.

DETAILED DESCRIPTION OF THE EXEMPLARY EMBODIMENT

Figure 1:
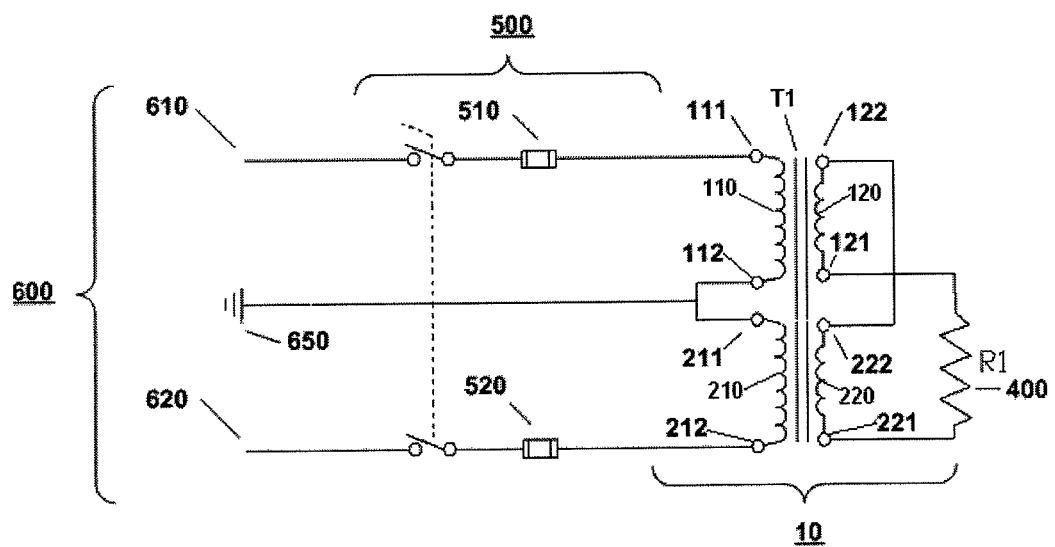
FIG. 1 is a schematic diagram illustrating an overview of one embodiment of the present invention.

FIG. 1 illustrates a conceptual overview of the overall architecture of the present invention. As illustrated, a single-phase transformer and a non-inductive resistor 400 are connected to form a noise suppression circuit Single Phaseback 10.

Two primary coils of the single-phase transformer T1 are connected in series. A first terminal 111 of the primary coil 110 and a second terminal 212 of the primary coil 210 are connected to a respective single-phase power line 610, 620 on the power distribution system 600 through a fused disconnect 500. In a preferred embodiment, a ground node 650 is also connected to a ground node (series point) that represents a common point of connection between the second terminal 112 of the primary coil 110 and the first terminal 211 of the primary coil 210.

A second terminal 122 of the secondary coil 120 of the single-phase transformer T1 is connected to a second terminal 222 of the secondary coil 220 of the single-phase transformers T1. A first terminal 121 of the secondary coil 120 of the single-phase transformer T1 is connected to a first terminal 221 of the secondary coil 220 of the single-phase transformers T1 through the non-inductive grid resistor 400.

The electromagnetic noise suppression circuit 10 protects any equipment on the power distribution system 600 against transient voltage spikes, line harmonics, and imbalanced phase voltage on any of the two power lines.

A voltage imbalance on any power line 610 or 620 creates an imbalance on the primary side 110/210 of the single-phase transformer T1, causing the current to flow through the secondary side 120/220 of the transformer and through non-inductive resistor 400, which functions to dissipate any excess energy induced by the harmonics.

At this time, feedback from the secondary side 120/220 of the transformer T1 to the primary side 110/210 of the transformer T1 will pull the voltage level on the affected line back to its normal voltage. During a fault, the secondary-to-primary feedback will cause the voltage to rise on the noisy primary line, and conversely, during a line transient, the voltage will drop on the affected primary lines. Thus, all noise causing an imbalanced current at any frequency will be filtered and only positive inductive feedback is fed back through the Single Phaseback to the primary coils 110/210 that are connected to low voltage lines 610 and 620. When the line voltages 610 and 620 are balanced, there is no power used by the Single Phaseback power filter.

It will be apparent to one of ordinary skill in the art that the present invention can be designed to accommodate differing levels of system voltages and frequencies. The power filter must balance the line-to-ground voltages as line-to-neutral or line-to-line balancing requires more than 10 times the Kilovolt-Amps (KVA), also it would not be as effective and would be less energy efficient. The transformer windings, size of the non-inductive grid resistor 400, and fuse current ratings of the fused disconnect 500 can all be adjusted using well-known formulas to ensure the suppression circuit is suited for its environment.

In one exemplary embodiment, the transformer T1 is 100 VA, 120/240-240/480 volt single-phase transformer. The resistor 400 is rated for approximately a 100 Watt 200 Ohm at nominal operating temperature. Furthermore, the resistor 400 is adjustable power resistor. Selection of transformers, winding ratios, and resistor values depend on the system the circuit is intended to protect.

The inventors have performed various experiments with one embodiment of the present invention. The exemplary test equipment was specifically designed to test transient voltage surge suppressor (TVSS) units rated for use in 120 volt 60 Hz power circuits. Exemplary equipment and procedure for testing the exemplary Single Phaseback Transient Voltage Surge Suppressor included the following devices and steps:

a) A 600-volt transient voltage spike generator ISLATROL TS-IV, Fluke 43b power quality analyzer, scope meter, Fluke 83 multimeter, Fluke T5-1000 multimeter, and 100 feet of shielded twisted 4-conductor cable;

b) Connecting the spike generator per manufacturer's instructions to generate 120 transient voltage spikes per second of 600 volt level each 30 microseconds in length. Tuning the spike generator to apply the spikes at the maximum (peak) voltage per alternation. Furthermore, tuning the spike generator to cause the voltage peak and the transient spike to be at maximum when the voltage is at maximum and at zero crossing. Applying 111 volts× 1.414, the 600 volt peak-to-peak spikes equals to 456.954 volts peak to peak; and c) The exemplary Single Phaseback Transient Voltage Surge Suppressor can comprise a split-phase (single-phase) 120/240 volt power circuit with each line to neutral measuring about 111 to 112 volts and the neutral is not bonded to ground (as to simulate a marine application). Line to ground voltage can be about equal to line to neutral voltage in the test circuit. The capacitive charge energy can be established with the conductors in the grounded shielded cable establishing the ground reference. This capacitive charge energy can be line-to-line, line-to-neutral and line-to-ground.

Figure 2:
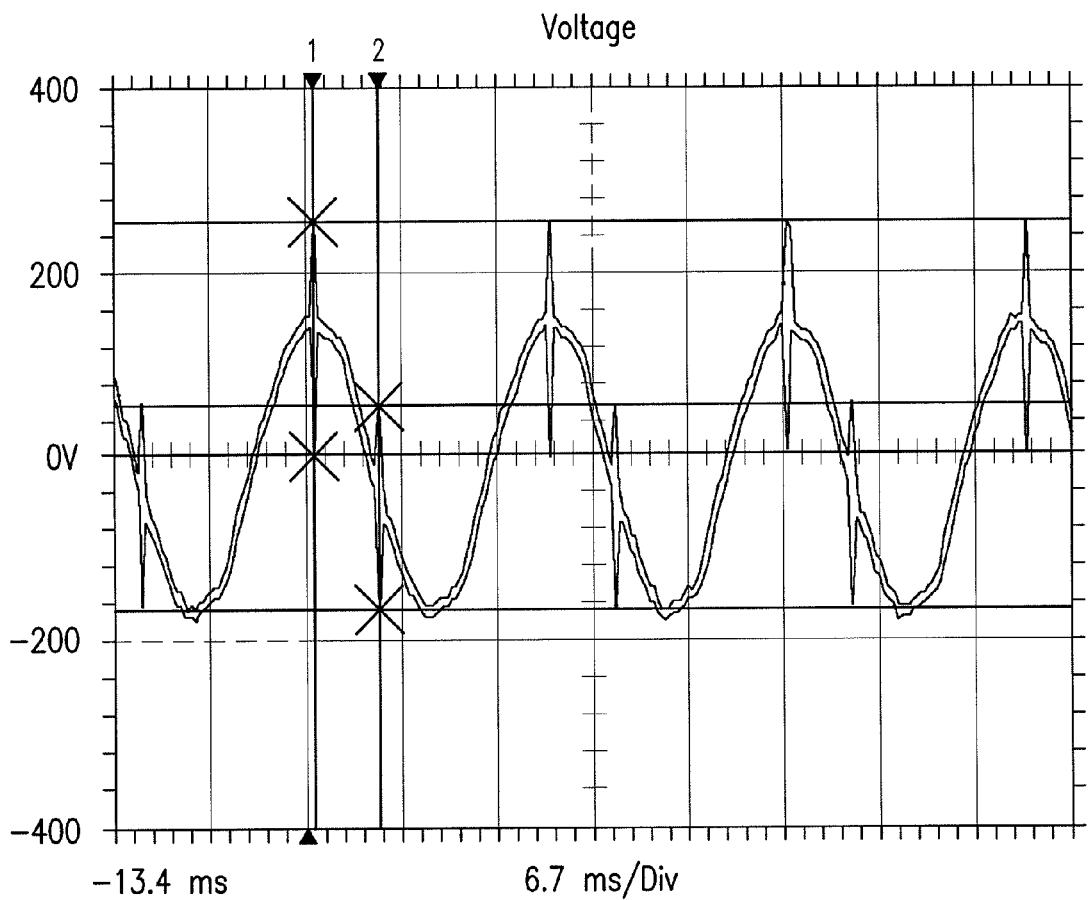
FIG. 2 presents the oscillogram of spike generator test voltage with Single Phaseback turned OFF.

FIG. 2 shows waveforms generated during one experiment without making use of the techniques of the present invention. As depicted, the waveform shows spikes at the peak voltage and at the zero crossing without the exemplary Single Phaseback embodiment of the present invention operating.

Figure 3:
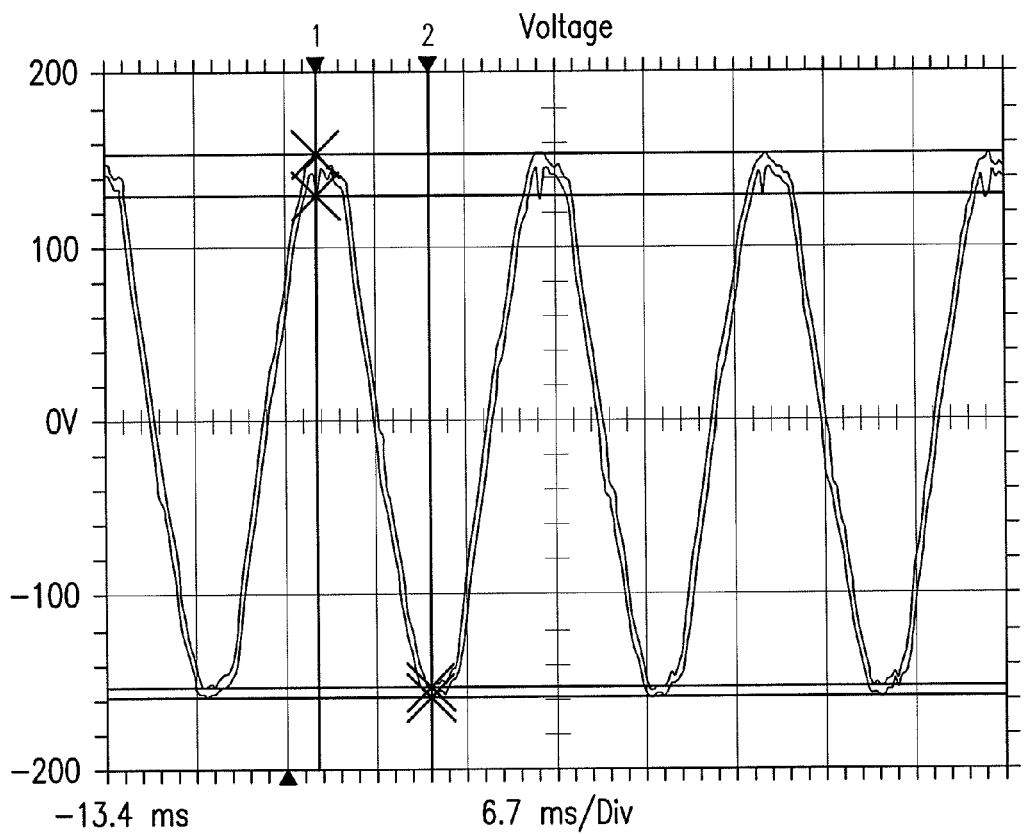
Figure 4:
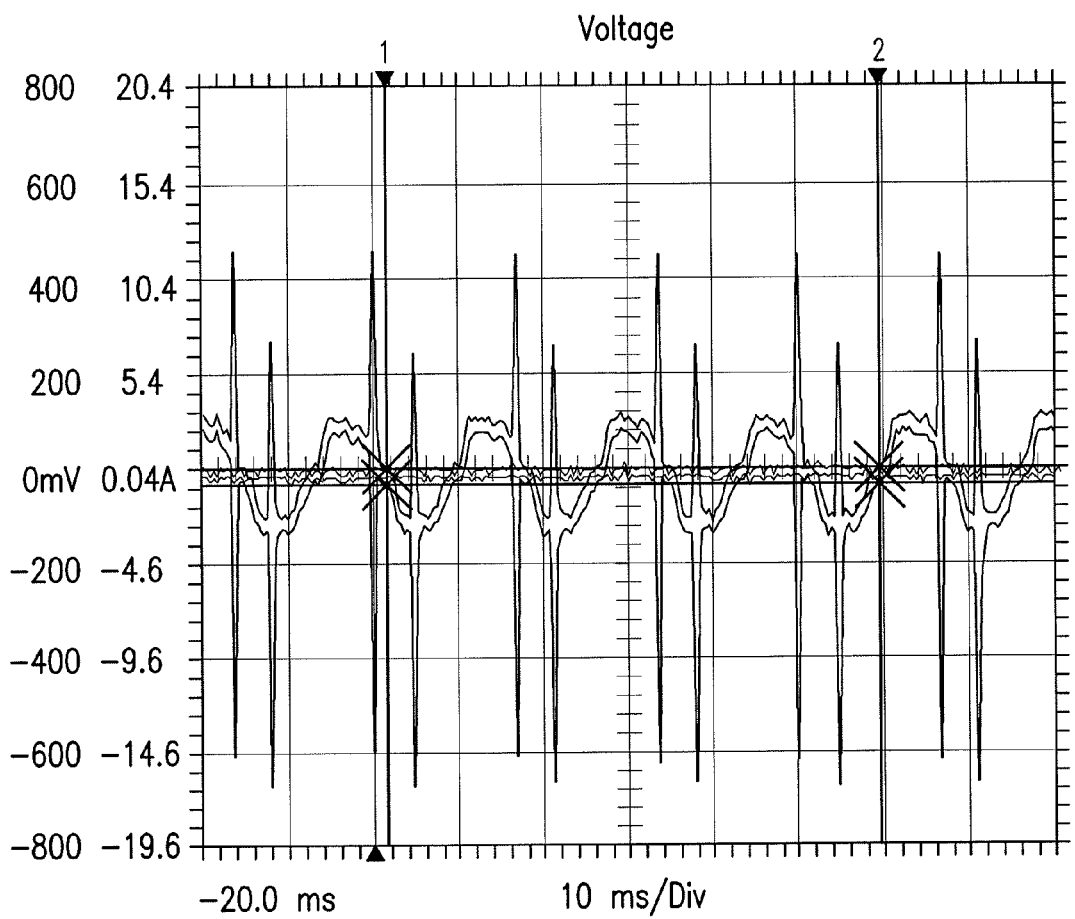
FIG. 4 presents the oscillogram that portrays the actual voltage spikes (noise) suppressed by the Single Phaseback.

FIGS. 3 and 4 show additional waveforms generated during experiments using an embodiment of the present invention as described above. FIG. 3 depicts waveforms with both the spike generator and the Single Phaseback embodiment of the present invention operating. As compared to FIG. 2, it will be appreciated that the present invention works to suppress the unwanted voltage spikes produced by the spike generator. FIG. 4 is showing the actual voltage spikes (noise) suppressed by the Single Phaseback and this event was recorded using a Fluke 43b power quality scope meter connected across the power resistor 400.

It will be understood to one of ordinary skill in the art that modifications, additions and substitutions could be made to the described exemplary embodiments without departing from the scope or spirit of the invention, which is defined in the appended claims. For example, a cooling fan could be placed in parallel with the non-inductive grid resistor 400 to dissipate heat produced during the operation of the circuit. Furthermore, this single-phase circuit design could work as well for a center-tapped grounded DELTA to stabilize line voltages.

We claim:

1. An apparatus for use with a power distribution system having at least a first power line and a second power line, the apparatus comprising:

a) an interface having an input side and an output side, said input side capable of being coupled to at least said first power line, said second power line and ground node, and said output side of said interface having at least a first and second output nodes;

b) a single-phase transformer having a primary side and a secondary side, said primary side having two primary coils, each primary coil having a first terminal and a second terminal, said first terminal of the first primary coil coupled to said first output node of said interface, said second terminal of the first primary coil coupled to said first terminal of the second primary coil and to said ground line, said second terminal of the second primary coil coupled to said second output node of said interface, and said secondary side of said transformer having two secondary coils, each secondary coil having a first terminal and a second terminal, the terminals on the secondary side arranged in an order of the first terminal of the second secondary coil, the second terminal of the second secondary coil, the first terminal of the first secondary coil, and the second terminal of the first secondary coil, and wherein said second terminal of the first secondary coil is coupled to said second terminal of the second secondary coil; and c) a power resistor, coupled between said first terminal of the first secondary coil and said first terminal of the second secondary coil.

2. The apparatus of claim 1, wherein said power resistor is adjustable.

3. The apparatus of claim 1, wherein said power resistor is rated for approximately 200 Ohms at normal operating temperature.

4. The apparatus of claim 1, wherein the circuit has a cooling device in place, such as a fan to assist in dissipating the heat produced during operation of the circuit.

* * * * *